(12) United States Patent
Drexl et al.

(10) Patent No.: US 6,186,302 B1
(45) Date of Patent: Feb. 13, 2001

(54) MOTOR VEHICLE CLUTCH

(75) Inventors: Hans-Jürgen Drexl, Schonungen; Reinhold Weidinger, Unterspiesheim; Winfried Stürmer, Euerbach, all of (DE)

(73) Assignee: Mannesmann Sachs AG, Schweinfurt (DE)

(*) Notice: Under 35 U.S.C. 154(b), the term of this patent shall be extended for 0 days.

(21) Appl. No.: 09/351,019

(22) Filed: Jul. 12, 1999

(30) Foreign Application Priority Data

Jul. 10, 1998 (DE) .............................................. 198 31 008

(51) Int. Cl.⁷ ...................................................... F16D 13/75
(52) U.S. Cl. ..................................... 192/70.25; 192/111 R
(58) Field of Search ............................. 192/89.23, 111 A, 192/111 B, 111 R, 70.25

(56) References Cited

U.S. PATENT DOCUMENTS

| | | | |
|---|---|---|---|
| 4,207,972 | * 6/1980 | Zeidler | 192/111 A |
| 5,404,979 | * 4/1995 | Craft et al. | 192/70.25 |
| 5,560,463 | * 10/1996 | Link et al. | 192/70.25 |
| 5,845,750 | * 12/1998 | Thirion De Briel et al. | 192/70.25 |
| 5,887,689 | * 3/1999 | Young | 192/70.25 |
| 6,021,877 | * 2/2000 | Weidinger et al. | 192/70.25 |

FOREIGN PATENT DOCUMENTS 29 20 932    11/1979   (DE) .

* cited by examiner

Primary Examiner—Charles A. Marmor
Assistant Examiner—Saul Rodriguez
(74) Attorney, Agent, or Firm—Cohen, Pontani, Lieberman & Pavane

(57) ABSTRACT

An adjustment ring of a motor-vehicle clutch is supported on bearing surfaces of supporting protrusions of a pressure plate by one of first and second supporting surfaces on the adjustment ring. The second supporting surface is axially closer to the pressure plate than the first supporting surface. The bearing surfaces and the first and second supporting surfaces are aligned parallel to the plane of rotation of the pressure plate. The first and second supporting surfaces are each connected via an oblique surface so that the adjustment ring is manually rotatable relative to the pressure plate between a first position where the first supporting surface bears on the bearing surface and a second position where the second supporting surface bears on the bearing surface.

12 Claims, 6 Drawing Sheets

MOTOR VEHICLE CLUTCH

BACKGROUND OF THE INVENTION

1. Field of the Invention

The invention relates to a motor-vehicle clutch having a diaphragm spring supported between a clutch housing and a pressure plate which is prestressed against a flywheel and an adjustment ring rotatably arranged between the pressure plate and the diaphragm spring such that the diaphragm is prestressed against the adjustment ring and the adjustment ring abuts bearing surfaces of supporting protrusions of the pressure plate via supporting surfaces.

2. Description of the Related Art

A prior art motor-vehicle clutch is disclosed in German reference DE 29 20 932 having a diaphragm spring supported between a clutch housing and a pressure plate. An adjustment ring is rotatably arranged on the pressure plate between the pressure plate and the diaphragm spring such that the diaphragm spring is prestressed against the adjustment ring. The adjustment ring of this prior art motor-vehicle clutch has obliquely running supporting surfaces which abut corresponding and likewise obliquely running bearing surfaces of the supporting protrusions of the pressure plate. Three helical springs prestress the adjustment ring in the adjustment direction such that the supporting surfaces of the adjustment ring have the tendency to move relative to the bearing surfaces such that the pressure plate maintains a relatively small distance from its flywheel. This makes it possible to compensate for any play which occurs by a rotation of the adjustment ring. A leaf spring which engages in ratchet teeth of the adjustment ring is intended to prevent the adjustment ring from being able to rotate counter to the adjustment direction. Furthermore, to prevent a return of the adjustment device, the angle of the bearing surfaces and of the supporting surfaces is selected to be small enough for self-locking to occur.

It has been found in practice that, as a result of vibrations, it is often the case that the self-locking which is necessary for the reliable functioning of the automatic adjustment device is insufficient. Such vibrations pass, primarily, via the engine into the motor-vehicle clutch and cannot be totally eliminated in the case of motor vehicles in particular. They may result in adjustment in the normal adjustment direction or counter to the normal adjustment direction.

In particular in the case of motor-vehicle clutches of commercial vehicles, the intention is for the wear volume of the clutch linings to be dimensioned to be as large as possible. This renders lining-wear compensation imperative, because otherwise it would no longer be possible for sufficient compressive force to be applied to the pressure plate by the diaphragm spring of the pressure plate at the end of the lining wear. If the adjustment thus malfunctions, this results in failure of the motor-vehicle clutch, which, in the case of a commercial vehicle, usually involves considerable follow-up costs.

SUMMARY OF THE INVENTION

The object of the present invention is to design a motor-vehicle clutch of the type having an adjustment ring for compensation of play in the clutch linings, such that, even in the case of long adjustment travel being necessary and of vibrations occurring, unintended adjustment is reliably ruled out.

The problem of unintended adjustment in an adjustment ring is solved according to the invention in that the adjustment ring is designed for rotation by hand and in that bearing surfaces of a pressure plate and supporting surfaces of the adjustment ring run parallel to the plane of the pressure plate. The different supporting surfaces of the adjustment ring are at different axial distances from the pressure plate and are each connected to one another by an oblique surface.

In this type of a motor-vehicle clutch, the adjustment ring is supported on the supporting protrusions of the pressure plate via surfaces that are parallel to a plane of rotation rather than via oblique surfaces. Therefore, even during vibrations, unintended return or adjustment does not occur. In many applications, the necessity for manual adjustment to compensate for wear of the friction linings does not constitute a disadvantage. This is particularly the case when the clutch is of the type that is released with power assistance. In this case, the increase in pedal force which occurs initially as wear increases is unimportant. In addition, precise coordination of the diaphragm-spring characteristic curve and the lining springs arranged axially between the friction linings of the clutch disk is not necessary because, with power-assisted actuation, there is no need for using the smallest release force possible. The present invention is based on the finding that it is more reliable to make manual adjustments after relatively long usage periods than to automatically adjust in smaller steps which are not reliable if vibration occurs in clutches with a large wear volume.

Unintended adjustment of the adjustment ring is prevented particularly reliably if the adjustment ring is secured against rotation by at least one securing screw which is threaded radially into the pressure plate.

The task of securing against unintended adjustment of the adjustment ring is particularly straightforward in design terms if the securing screw has a head which presses radially against the adjustment ring in the securing position.

In a further embodiment, the releasing and tightening of a release screw may be dispensed with if a catch spring is used to secure the adjustment ring in one of its possible adjustment positions.

When the adjustment ring includes first and second supporting surfaces for a possible adjustment in two stages, the adjustment ring may comprise a limiting device or stop on the second supporting surface of the adjustment ring that is a smaller distance from the pressure plate than the first supporting surface so that the adjustment ring is always rotated to the second supporting surface with the second supporting surface resting on the bearing surface to a sufficient extent. The end position may be fixed by any sufficient limiting means such, for example, as a toothed segment.

The limiting means is particularly straightforward in design terms if the supporting surface has a stop which limits the possible adjustment movement of the adjustment ring and is positioned against the supporting protrusions of the pressure plate.

Manual adjustment may be effected in a straightforward manner, for example, by using a screwdriver which is to be introduced radially into the motor-vehicle clutch if the adjustment ring has a toothed segment, having teeth, for the manual adjustment or if at least certain segments of the external diameter of the adjustment ring have tooth-like protrusions.

Alternatively, however, it is also possible for a pinion to be mounted rotatably in the pressure plate with an axis aligned radially in relation to the motor-vehicle clutch, and for the teeth of the toothed segment to be aligned in accordance with the progression of the supporting surface.

In this embodiment, teeth on the pinion are in meshed engagement with the toothed segment of the adjustment ring such that the adjustment ring is adjusted by turning the pinion.

The motor-vehicle clutch may also be adjusted by an axially or radially engaging tool if a pinion is mounted rotatably in the pressure plate with an axis aligned in an axis-parallel manner or radially in relation to the motor-vehicle clutch, and said pinion engages with the teeth of the toothed segment.

It is particularly straightforward to arrest the adjustment ring in its respective adjustment position if, on the side which is located opposite the toothed segment, the adjustment ring has an arresting protrusion and a catch spring is designed as a leaf spring and is fastened on the pressure plate by way of one end and, at its free end, has a v-shaped bent portion which, in the first position of the adjustment ring, engages over one end of the arresting protrusion of the adjustment ring and, in the second position of the adjustment ring, snaps behind the other end of the arresting protrusion.

However, it is also conceivable for the arresting protrusion to be located at another location on the circumference. Furthermore, it is also possible for the arresting protrusion to be replaced by arresting depressions. Instead of a leaf-like design of the catch spring, other types of spring are also possible. It would also be possible for one spring end to be connected fixedly to the housing, although in this case the spring would have to withstand the lifting-off and wear travel of the pressure plate. Instead of a v-shaped bent portion at the free end, the latter could also be of circular, oval or trapezoidal configuration.

The motor-vehicle clutch according to the invention may also be a pulling-actuation clutch, which can be used together with a two-mass flywheel, automatic clutch actuation, a clutch disk with/without lining spring mechanism, and narrower, and to make up for this, thicker linings for larger torsion-damper diameters for better torsional-vibration damping in the drive train.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
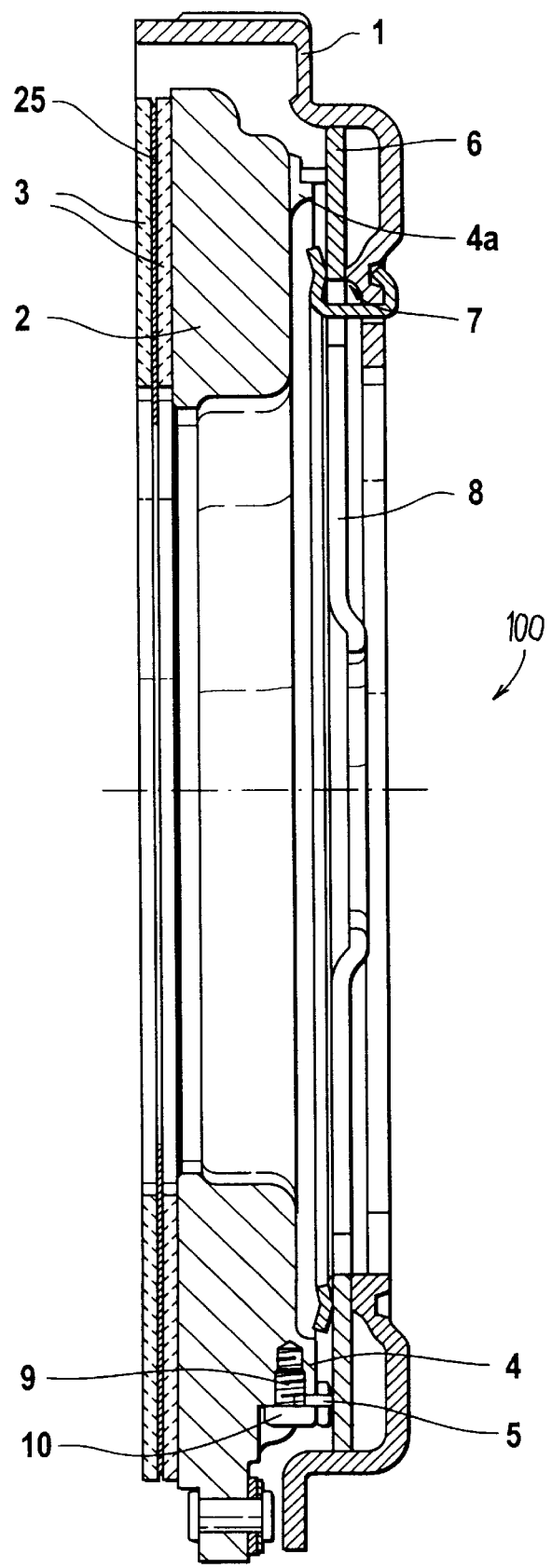
FIG. 1 is a longitudinal sectional view through a pressure plate arrangement of a motor-vehicle clutch according to an embodiment of the present invention.

FIG. 1 shows a motor-vehicle clutch 100 according to an embodiment of the present invention including a housing 1 and a pressure plate 2. Clutch linings 3 of a clutch disk 25, only part of which is illustrated, are pressed against a flywheel (not shown) in the coupled state by the pressure plate 2. The outer side of the pressure plate 2 has a plurality of supporting protrusions 4, 4a on which an adjustment ring 5 is rotatably arranged. A diaphragm spring 6 abuts a peripheral region of the adjustment ring 5. The diaphragm spring 6 is also supported against a tilting edge 7 of the clutch housing 1 and has radially inwardly directed fingers 8 on which a release device (not shown) acts to release the clutch 100. Instead of the depicted embodiment, the clutch 100 may also comprise a pulling-actuation clutch in which case the bearing location is in the region of the internal diameter of the diaphragm spring.

Also shown is a securing screw 9 screwed radially into the pressure plate 2. The securing screw 9 has a head 10 such that when the screw 9 is in the tightened state, the head 10 is held against the adjustment ring 5, thereby securing it against rotation.

Figure 2:
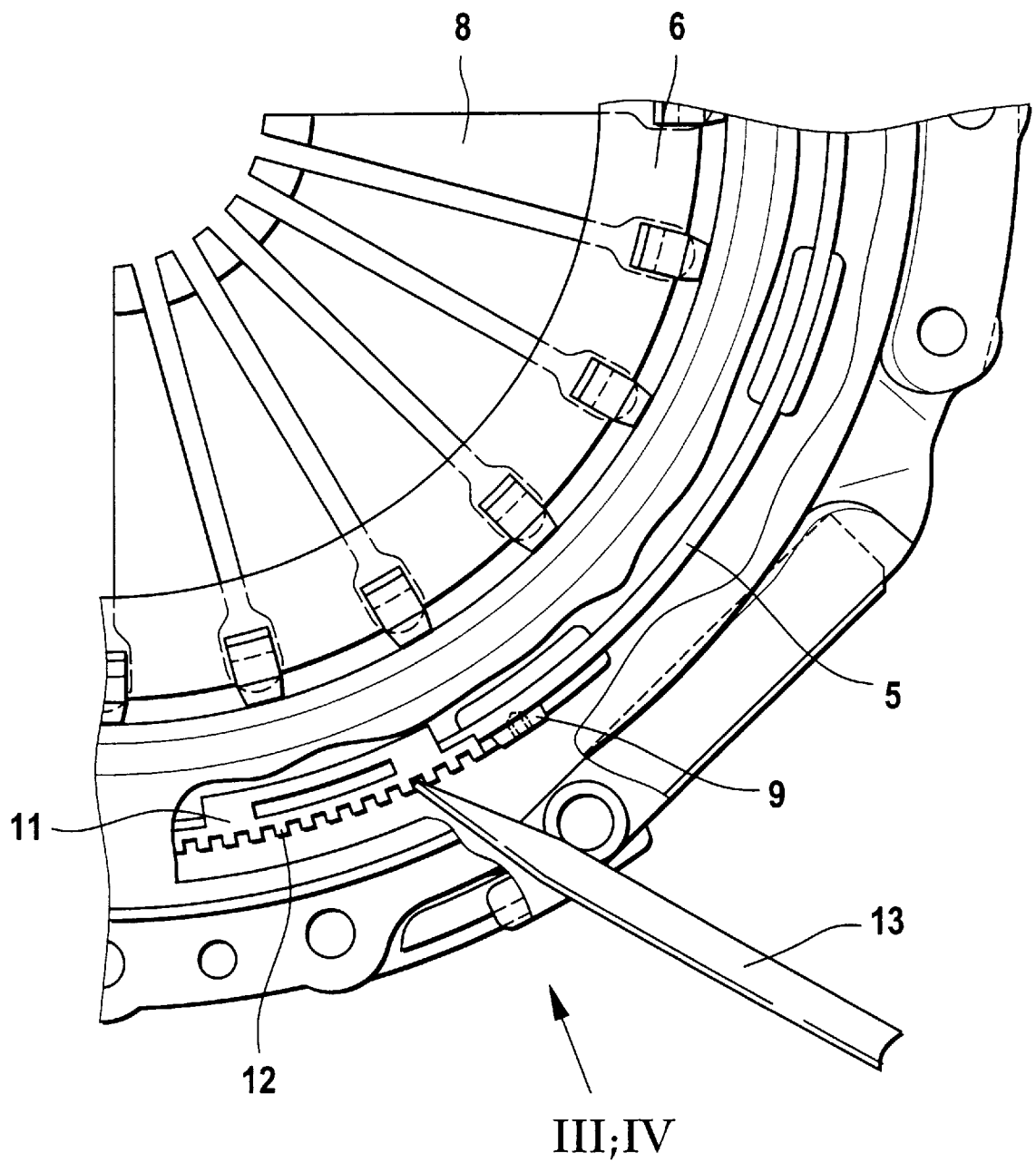
FIG. 2 is a partial sectional view showing a rear view of the pressure plate arrangement of FIG. 1.

FIG. 2 shows a toothed segment 11 having teeth 12 arranged on the adjustment ring 5. Access is provided to the toothed segment 11 such that a screwdriver 13 may be inserted into the clutch 100 to release the securing screw 9 and radially engage the teeth 12 to rotate the adjustment ring 5.

Figure 3:
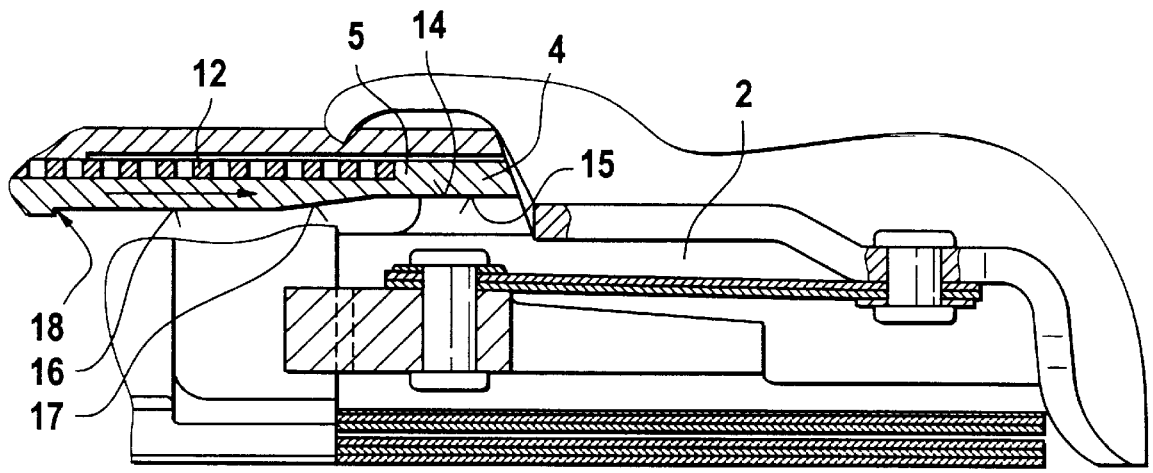
FIG. 3 is an enlarged view of the pressure plate arrangement as viewed along the direction indicated by arrow III, IV in FIG. 2 with unworn clutch linings.

The function of the adjustment ring 5 is described with reference to FIGS. 3 and 4. The supporting protrusion 4 projects from a surface of the pressure plate 2 and has a bearing surface 14 that is raised above and aligned parallel to a plane of the surface of pressure plate 2 facing the adjustment ring 5. A first supporting surface 15 of the adjustment ring 5 abuts the bearing surface 14. The adjustment ring 5 has a second supporting surface 16, which is at a smaller distance from the pressure plate 2 than the first supporting surface 15. The first and second supporting surfaces are connected by an oblique surface 17 which runs therebetween. A stop 18 is arranged on an edge of the second supporting surface 16 which projects toward the pressure plate 2. The stop 18 is arranged such that it is positioned against the supporting protrusion 4 when the adjustment ring 5 is rotated to the right, as seen in FIG. 3 and the second supporting surface 16 is aligned with the bearing surface 14. The stop 18 may also be located at another location of the clutch 100. For example, the toothed segment 11 could strike against a stop located on the pressure plate 2.

Figure 4:
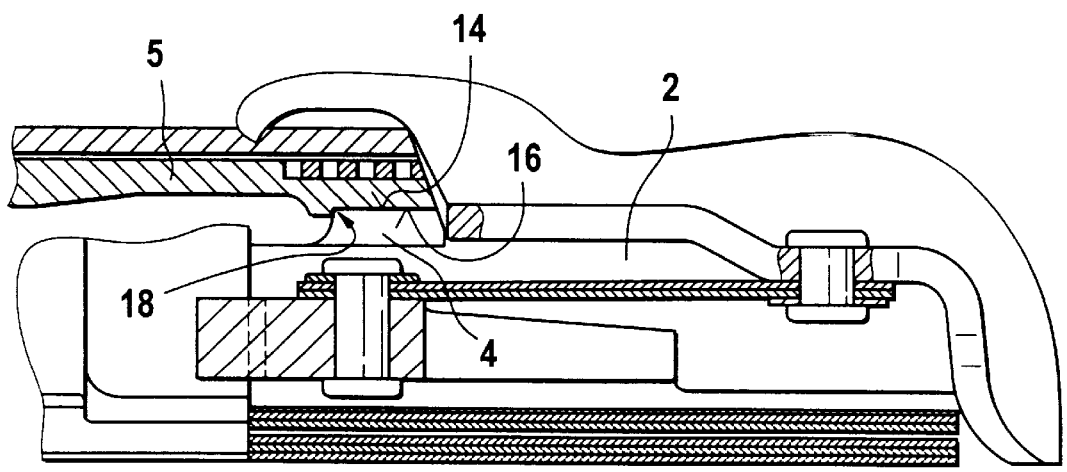
FIG. 4 is an enlarged view corresponding to FIG. 3 in the adjusted position of the motor-vehicle clutch.

FIG. 4 shows the adjusted position of the adjustment ring 5. In this position, the second supporting surface 16, rather than the first supporting surface 15 seen in FIG. 3, of the adjustment ring 5 is supported on the bearing surface 14 of the supporting protrusion 4. Once the adjustment ring 5 has been rotated such that the second supporting surface 16 is properly positioned against the bearing surface 14, the stop 18 butts against the supporting protrusion 4 so that further rotation of the adjustment ring 5 to the right is prevented.

Figure 5:
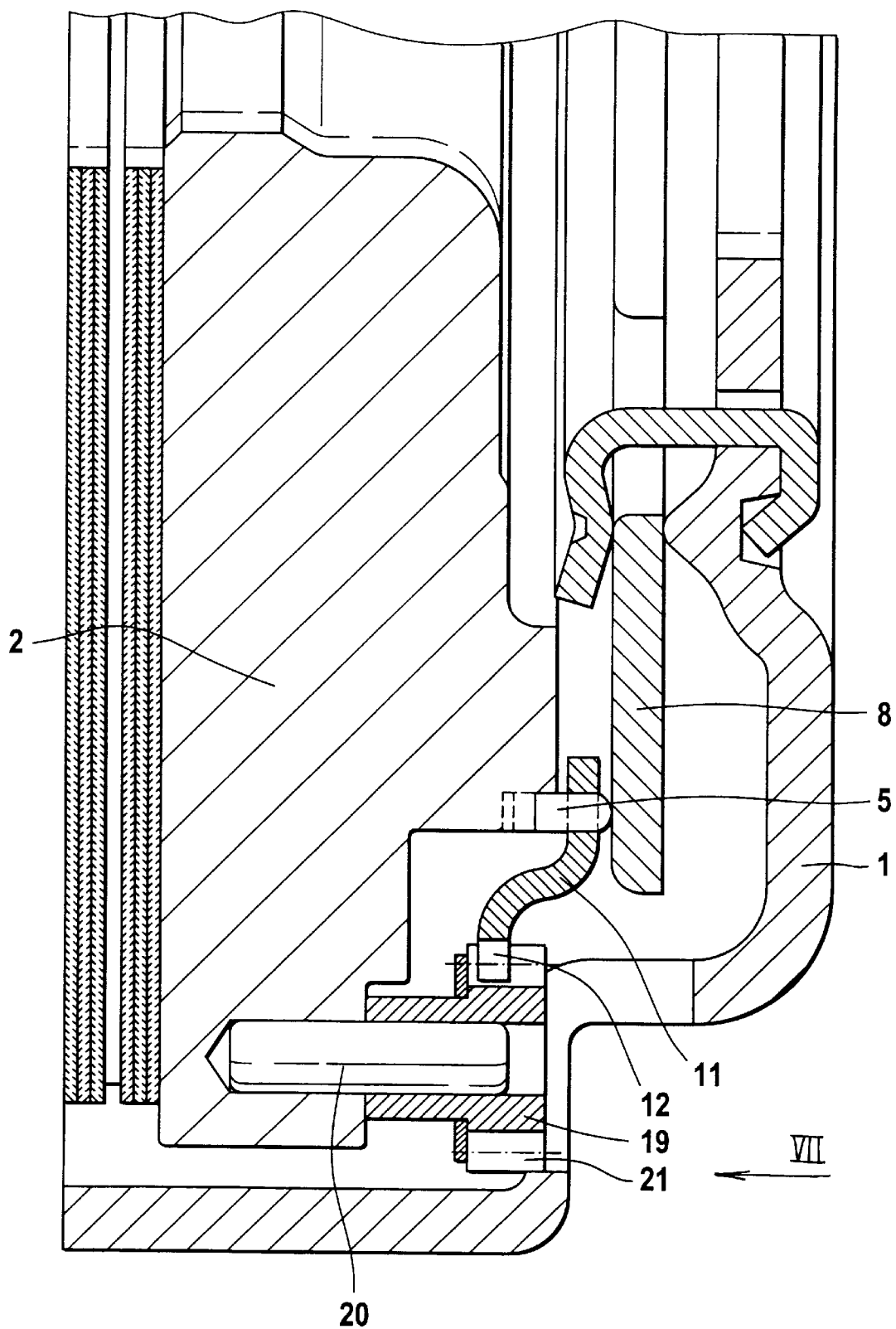
FIG. 5 is an enlarged longitudinal sectional view of another embodiment of the motor-vehicle clutch.

The embodiment of the clutch 100 shown in FIG. 5 comprises a pinion 19 mounted on the pressure plate 2 on an axis 20 which is aligned axially in relation to the pressure plate 2. The pinion 19 meshes with the teeth 12 of the toothed segment 11 of the adjustment ring 5 by a toothing arrangement 21. Accordingly, rotation of the pinion results in a adjustment of the position of the adjustment ring 5.

Figure 6:
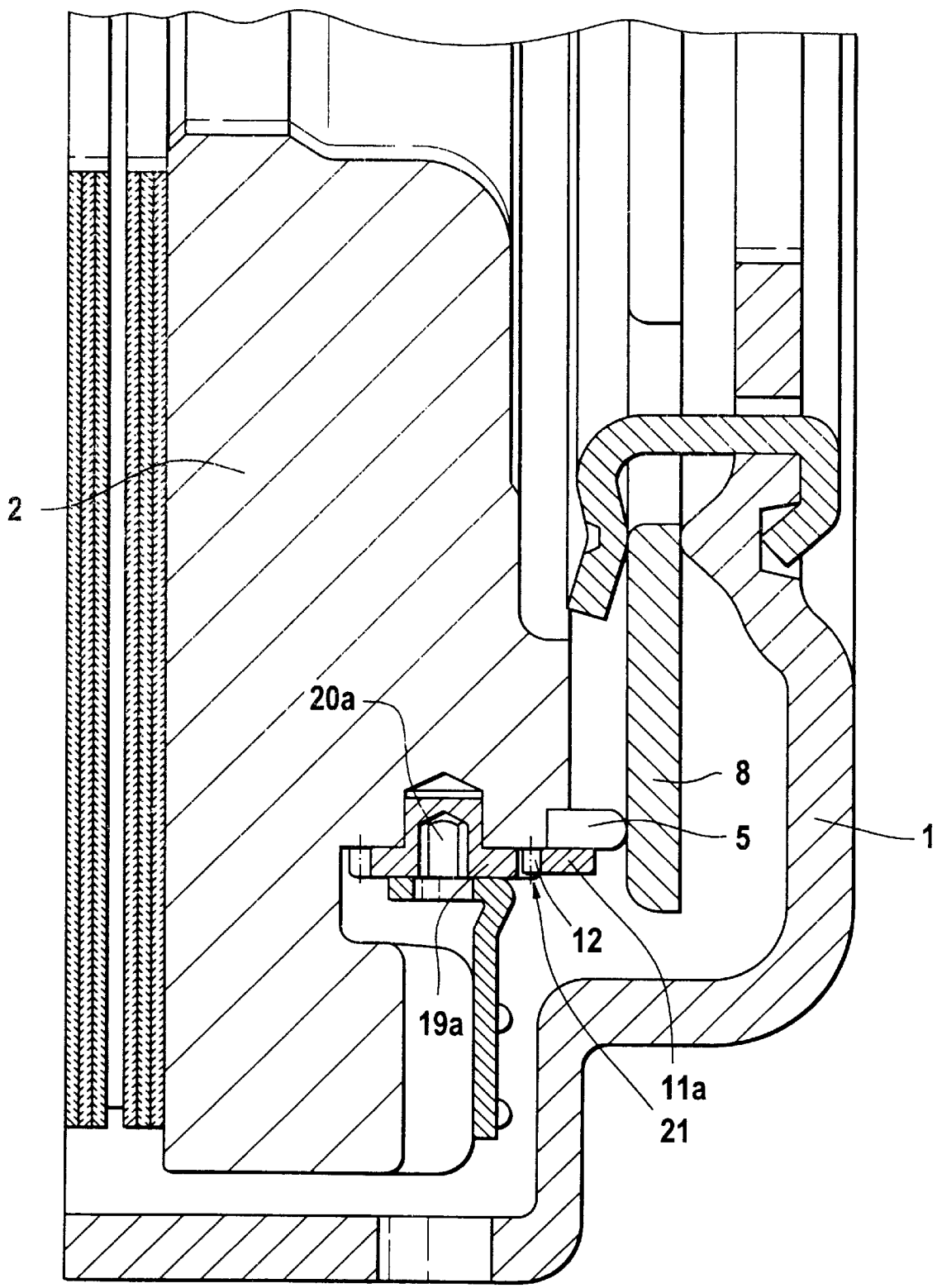
FIG. 6 is an enlarged longitudinal sectional view of yet another embodiment of the motor-vehicle clutch.

The embodiment of FIG. 6 shows an axis 20a with a pinion 19a which runs radially in relation to the pressure plate 2. In this case, the teeth 12 of the toothed segment 11a follow the progression of the surfaces 14, 16, 17, with the result that the pinion 19a always remains in engagement with the teeth 12 of the toothed segment 11a.

Figure 7:
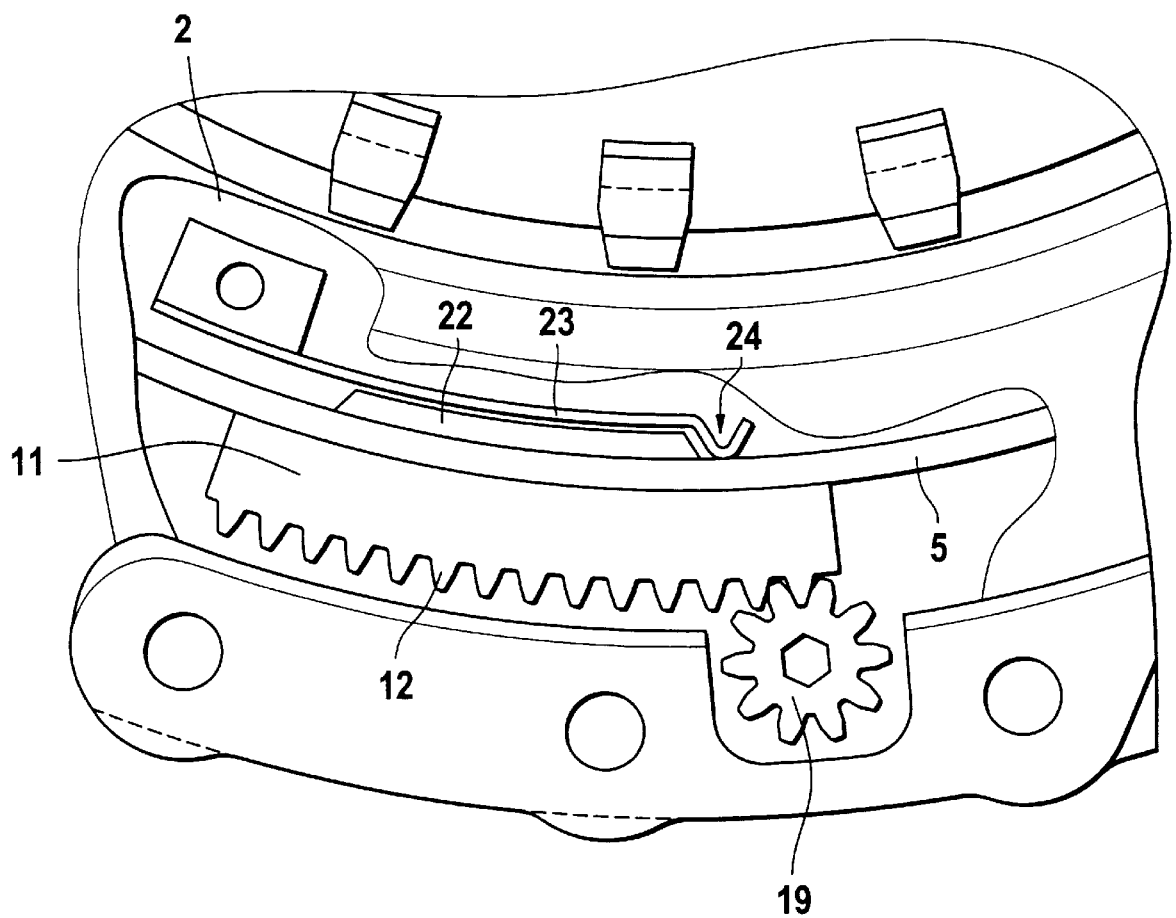
FIG. 7 shows a partial sectional rear view of the motor-vehicle clutch which is shown in FIG. 5 along the direction of arrow VII.

FIG. 7 shows how the pinion 19 meshes with the teeth 12 of the toothed segment 11 of the adjustment ring 5. FIG. 7 further shows that the adjustment ring 5 comprises an elongate arresting protrusion 22 on a side of the adjustment ring 5 which is located opposite from the toothed segment 11. A catch spring 23 has one end having a v-shaped bent portion 24 which engages the elongate arresting protrusion 22. The other end of the catch spring 23 is fastened on the pressure plate 2. The catch spring 23 is designed as a leaf spring in FIG. 7. However, any other type of spring may also be used. In addition, any shape may be used for bent portion 24 which engages the elongate arresting protrusion 22. Furthermore, depressions may be used instead of protrusions 22.

The invention is not limited by the embodiments described above which are presented as examples only but can be modified in various ways within the scope of protection defined by the appended patent claims.

We claim:

1. A motor-vehicle clutch, comprising:
   a clutch housing rotatably mounted about an axis of rotation;
   a pressure plate rotatably mounted about said axis of rotation for rotation about said axis of rotation with said clutch housing and axially movably mounted for axial movement relative to said clutch housing, said pressure plate having protrusions projecting from a side of said pressure plate facing said clutch housing, and said protrusions having bearing surfaces arranged parallel to a plane of rotation of said pressure plate;
   a diaphragm spring supportably arranged between said clutch housing and said pressure plate for urging said pressure plate against a clutch disk; and
   an adjustment ring arranged between said diaphragm spring and said pressure plate having first and second supporting surfaces arranged parallel to said plane of rotation of said pressure plate, said first and second supporting surfaces being connected by an oblique surface so that said first supporting surface is at a different axial distance from said pressure plate than said second supporting surface, said bearing surfaces of said pressure plate selectively abutting one of said first and second supporting surfaces, wherein said adjustment ring is rotatable relative to said pressure plate and manually adjustable between a first position wherein said first supporting surfaces bear against said bearing surfaces and a second position wherein said second supporting surfaces bear against said bearing surfaces.

2. The motor-vehicle clutch of claim 1, further comprising a securing screw radially screwed into said pressure plate for securing said adjustment ring against rotation relative to said pressure plate when said securing screw is in a securing position.

3. The motor-vehicle clutch of claim 2, wherein said securing screw comprises a head which presses radially against said adjustment ring when said securing screw is in said securing position.

4. The motor-vehicle clutch of claim 1, further comprising a catch spring arranged between said adjustment ring and said pressure plate for securing said adjustment ring in one of said first and second positions.

5. The motor-vehicle clutch of claim 1, wherein said second supporting surface of said adjustment ring is a smaller axial distance from said pressure plate than said first supporting surface and comprises means for limiting the adjustment movement of the adjustment ring.

6. The motor-vehicle clutch of claim 5, wherein said means for limiting comprises a stop mounted on said second supporting surface which abuts said supporting protrusions of said pressure plate for limiting the possible adjustment movement of the adjustment ring when said adjustment ring is in said second position.

7. The motor-vehicle clutch of claim 1, wherein said adjustment ring further comprises a toothed segment having teeth for facilitating manual adjustment of said adjustment ring relative to said pressure plate.

8. The motor-vehicle clutch of claim 7, further comprising a pinion rotatably mounted on said pressure plate with an axis aligned parallel to said axis of rotation of said motor-vehicle clutch, said pinion in meshed engagement with said teeth of said toothed segment.

9. The motor-vehicle clutch of claim 7, further comprising a pinion rotatably mounted on said pressure plate with an axis aligned radially to said axis of rotation of said motor-vehicle clutch, wherein said teeth of said toothed segment are aligned in accordance with the progression of said first supporting surface, said oblique surface and said second supporting surface of said adjustment ring.

10. The motor-vehicle clutch of claim 1, wherein said adjustment ring further comprises an arresting protrusion, and a catch spring fastened on said pressure plate comprises a free end comprising a bent portion which engages one end of said arresting protrusion when said adjustment ring is in said first position and engages another end of said arresting protrusion when said adjustment ring is in said second position.

11. The motor-vehicle clutch of claim 10, wherein said catch spring comprises a leaf spring.

12. The motor-vehicle clutch of claim 11, wherein said bent portion comprises a v-shaped bent portion.

* * * * *